(12) United States Patent
Theobald et al.

(10) Patent No.: US 10,279,564 B2
(45) Date of Patent: May 7, 2019

(54) METHOD OF MANUFACTURING A PART WITH A HIGH QUALITY SURFACE FINISH AND COMPLEX INTERNAL GEOMETRY

(71) Applicant: Apple Inc., Cupertino, CA (US)

(72) Inventors: Matthew S. Theobald, San Francisco, CA (US); Sarah J. Montplaisir, Pacifica, CA (US)

(73) Assignee: Apple Inc., Cupertino, CA (US)

( * ) Notice: Subject to any disclaimer, the term of this patent is extended or adjusted under 35 U.S.C. 154(b) by 625 days.

(21) Appl. No.: 14/216,614

(22) Filed: Mar. 17, 2014

(65) Prior Publication Data

US 2015/0093590 A1   Apr. 2, 2015

Related U.S. Application Data

(60) Provisional application No. 61/884,901, filed on Sep. 30, 2013.

(51) Int. Cl.
| | |
|---|---|
| *B23K 26/24* | (2014.01) |
| *B32B 15/01* | (2006.01) |
| *B32B 3/26* | (2006.01) |
| *B32B 7/04* | (2019.01) |

(52) U.S. Cl.
CPC ............ *B32B 15/01* (2013.01); *B23K 26/24* (2013.01); *B32B 3/266* (2013.01); *B32B 7/045* (2013.01); *B32B 2307/718* (2013.01); *B32B 2457/00* (2013.01); *Y10T 428/12292* (2015.01)

(58) Field of Classification Search
CPC ................................ B32B 3/266; B32B 7/045
See application file for complete search history.

(56) References Cited

U.S. PATENT DOCUMENTS

| | | | | |
|---|---|---|---|---|
| 5,039,577 A | * | 8/1991 | Knoell | B32B 7/02 165/905 |
| 2009/0324987 A1 | * | 12/2009 | Copley | B23K 15/0006 428/593 |
| 2013/0025560 A1 | * | 1/2013 | Thomas | F02F 1/24 123/193.5 |
| 2013/0273387 A1 | * | 10/2013 | Kleier | B23K 13/00 428/577 |
| 2014/0011045 A1 | * | 1/2014 | Slemp | B23K 1/0008 428/613 |

* cited by examiner

*Primary Examiner* — Humera N Sheikh
*Assistant Examiner* — Xiaobei Wang
(74) *Attorney, Agent, or Firm* — Dickinson Wright RLLP (57) ABSTRACT

A structural member having an internal geometry capable of receive an object and substantially seamless outer surfaces, and that is obtainable by a method that includes providing several small plates, welding together the small plates, removing the weld residue, and polishing an outer surface of the structural member to achieve a certain desired visual effect. A middle plate, or several middle plates, may be positioned between a first plate and a second plate. The middle portion occupied by the middle plates includes an opening, cavity, and/or channel. The opening, cavity, and/or channel may receive a cable from an electronic device, or house a component. The plates and the opening, cavity, and/or channels between the plates, generally have a small form factor, and accordingly, require an assembly process to create the opening, cavity, and/or channels rather than using traditional drilling and/or milling techniques.

15 Claims, 5 Drawing Sheets

```
                                                            ┌─ 100
                                                      ┌─ 110
┌─────────────────────────────────────────────────────────────┐
│ Procuring a first plate, a second plate, and at least one center plate, each │
│ plate being made from stainless steel material and having a length substantially │
│    greater than a thickness of the plate, with the at least one center plate │
│      further including at least one aperture formed through the thickness thereof │
└─────────────────────────────────────────────────────────────┘
                              │
                              ▼                       ┌─ 112
┌─────────────────────────────────────────────────────────────┐
│  Assembling together the first plate, the at least one center plate, and the │
│    second plate to form a metallic part having a complex internal geometry │
│           and peripheral faces having at least two side seams │
└─────────────────────────────────────────────────────────────┘
                              │
                              ▼                       ┌─ 114
┌─────────────────────────────────────────────────────────────┐
│    Welding each of the at least two side seams around the peripheral faces │
└─────────────────────────────────────────────────────────────┘
                              │
                              ▼                       ┌─ 116
┌─────────────────────────────────────────────────────────────┐
│     Without heat treatment, mechanically removing weld residue from the │
│     peripheral faces to form smooth peripheral surfaces without visible seams │
└─────────────────────────────────────────────────────────────┘
```

METHOD OF MANUFACTURING A PART WITH A HIGH QUALITY SURFACE FINISH AND COMPLEX INTERNAL GEOMETRY

CROSS-REFERENCE TO RELATED APPLICATION(S)

This application claims the benefit of priority under 35 U.S.C. § 119(e) to U.S. Provisional Application No. 61/884,901, filed on Sep. 30, 2013, the disclosure of which is incorporated herein by reference in its entirety.

FIELD

The described embodiments relate to methods for manufacturing a metallic part having a complex internal geometry and a high quality surface finish.

BACKGROUND

In the ongoing development of small personal computerized products such as laptops, tablets and smart phones, the casings or enclosures that organize, secure and protect the electronic components have also experienced significant transformation in response to the continuous pressure to reduce the size and weight of these structures. In many situations, the ongoing reductions have pushed the size of the individual structural pieces below that which can be easily or economically mass produced using conventional manufacturing techniques. At the same time, structural members that were previously enclosed within the casing have been moved to exterior positions where the aesthetics and appearance of the member become a concern.

Consequently, a need exists for improved methods for reliably producing small structural members that also meet the exterior aesthetic and design requirements of the overall product. It is towards such a manufacturing method that the present disclosure is directed.

SUMMARY

In one aspect, a method for forming a part having a complex internal geometry and a cosmetic exterior surface is described. The method may include forming a first feature through a surface of at least one of a plurality of metallic layers, the plurality of metallic layers may define the part, the plurality of metallic layers may each have a length substantially greater than a thickness. The method may also include joining the plurality of metallic layers together. The first formed feature may define a first cavity having the complex internal geometry within the part.

In another aspect, a structural member may be formed by the process of welding a plurality of layers together is described. The plurality of layers may define the structural member, the structural member may have a first cavity. The process of forming the structural member may also include removing a residual portion of the welding on an outer peripheral portion of the structural member. The process of forming the structural member may also include polishing the outer peripheral portion.

In another aspect, a method of forming a structural member having a plurality of metallic layers and a cavity extending through the plurality of metallic layers is described. The method may include a means for bonding the plurality of metallic layers. The plurality of metallic layers may include a first metallic layer having a dimension less than remaining plurality of metallic layers. The method may further include a means for positioning the first metallic layer to define the cavity. The cavity may extend from a first end of the structural member to a second end of the structural member. The second end may be different from the first end.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Traditional methods for creating a cavity or opening through a metal or plastic substrate include a machining operation (such as milling or drilling). Of course, the dimensions of the cavity are less than the face of the substrate. Accordingly, when the face of the substrate to be machined is relatively small, for example, 10 millimeters ("mm"), a circular cavity is may have a diameter of, for example, 4 mm. The diameter of the cavity generally corresponds to the diameter of the drilling tool. Generally, the maximum depth-to-diameter (of the drilling tool) ratios for drilling are 6:1. In the example above, a 4-mm diameter drilling tool may be able to drill to a maximum depth of 24 mm. In rare cases, the ratio may be increased to 8:1 creating a corresponding drilling depth of 32 mm. Issues arise when the desired cavity in the substrate exceed the maximum depth-to-diameter ratios.

This detailed description provides an alternate method for creating a cavity in a structure. The lengthwise dimension of the structure may be on the order of several hundred millimeters. Rather than drill a cavity into structures, this detailed description describes a method of stacking several layers of material, with a middle portion having smaller dimensions than a portion above the middle portion and a portion below the middle portion thereby leaving the structure with a cavity of any desired length. It would be appreciated by one of skill in the art that it would be difficult, if not impossible, to machine a solid substrate using conventional tooling and manufacturing techniques, especially in the small sizes described.

FIGS. 1-5 show several representative embodiments of a method for making metallic parts have complex internal geometries and a substantially seamless surface finish. The term "seamless" as used throughout this detailed description and in the claims refers to a surface having no traces of a seam and/or joint resulting from joining one or more structures together, where joining structures may include welding one or more plates together thereby leaving traces of weld material and/or weld marks. This method can provide several significant advantages and benefits over other methods for making metallic parts with internal geometries. The recited advantages are not meant to be limiting in any way, however, as one skilled in the art will appreciate that other advantages may be realized upon practicing the present disclosure. In addition, it is also to be appreciated that certain aspects, embodiments, implementations or features of the described methods may be used separately or in different combinations, and that other uses and applications may also be possible and considered to fall within the scope of the present disclosure.

FIGS. 1A-1E illustrate schematic views of a plurality of plates undergoing a manufacturing process. In some embodiments, the plates could be aluminum, titanium, or plastic. In the embodiment shown in FIGS. 1A-1E, the plates are stainless steel, and in particular, stainless steel grade 304 (austenitic). In other embodiments, stainless steel grade 410 could be used. The illustrations have been sequentially organized to illustrate, in accordance with one representative embodiment, a method for making a final, polished configuration 80 (shown in FIG. 1E) having a channel 82 and a substantially seamless surface 86. Throughout the illustrations, like structures are identified with like reference numerals throughout the figures.

Figure 1A:
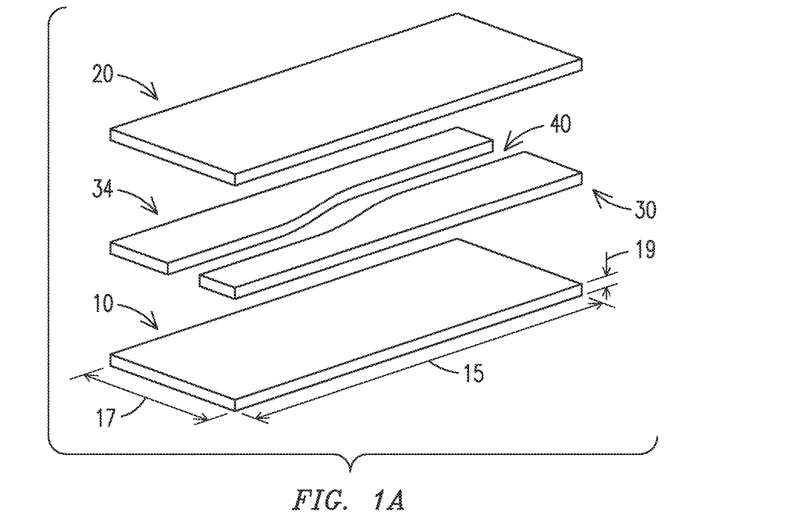
FIGS. 1A-1E are perspective schematic views of a plurality of metallic plates that together illustrate a method for making a metallic part, in accordance with one representative embodiment of the present disclosure.

FIG. 1A is an exploded view showing individual components of the structure. A first plate 10 and a second plate 20 form a bottom and top surface, respectively, for the metallic part. In some embodiments, first plate 10 and second plate 20 may vary in length 15 and/or width 17. In the embodiment shown in FIG. 1A, first plate 10 and second plate 20 both have a substantially identical length 15 and width 17. Length 15 of first plate 10 and second plate 20 are approximately 40 millimeters, but length 15 of first plate 10 and second plate 20 could vary. In other words, length 15 of first plate 10 and second plate 20 could be longer or shorter to achieve a desired dimension for a path for a cable or wire (discussed below). Length 15 could be as long as 300 mm in some embodiments, and as short as 10 mm in other embodiments. First plate 10 and/or second plate 20 may have a thickness 19 approximately in the range of 2.5 mm to 6 mm. However, in some embodiments, thickness 19 could be 1 mm. Generally, the ratio of length 15 to thickness 19 is approximately within the range of 10:1 to 100:1.

Also, in some embodiments, first plate 10 has a greater thickness than that of second plate 20. In other embodiments, second plate 20 has a greater thickness than that of first plate 10. In the embodiment shown in FIG. 1A, the thickness of first plate 10 is substantially identical to the thickness of second plate 20. Also, first plate 10 and second plate 20 have a substantially uniform thickness.

Between first plate 10 and second plate 20 are a first center plate 30 and second center plate 34. First center plate 30 and second center plate 34 may have a thickness approximately in the range as that of first plate 10 and second plate 20. First center plate 30 and second center plate 34 may be configured to have at least one dimension different from that of first plate 10 and second plate 20. For example, FIG. 1A shows both first center plate 30 and second center plate 34 having a width less than width 17 of first plate 10 and second plate 20. Consequently, when first center plate 30 and second center plate 34 are spaced apart to align with the lengthwise surfaces of first plate 10 and second plate 20, a channel 40 is formed. First center plate 30 and second center plate 34 may be made of the same materials as described for first plate 10 and second plate 20. Also, in some embodiments, first center plate 30 could have a greater thickness than that of second center plate 34, or vice versa. Accordingly, thickness of channel 40 could vary (that is, the thickness may be non-uniform).

Channel 40 is configured to allow objects to objects such as wires or cables to pass through channel 40. A cable may have a diameter approximately in the range of 0.5 to 3 mm. As shown in FIG. 1A, channel 40 has a wavelike configuration corresponding to wavelike configurations along an inner lengthwise dimension of first center plate 30 and second center plate 34. The phrase "inner lengthwise dimension" as used throughout this detailed description and in the claims refers to the lengthwise dimension of first center plate 30 that directly faces a lengthwise direction of second center plate 34, or vice versa. In other embodiments, first center plate 30 and second center plate 34 could be substantially linear inner lengthwise dimension. Still, in other embodiments, first center plate 30 could have a different inner lengthwise dimension than that of second center plate 34 in order to achieve a desired complex internal geometry for an object to pass through channel 40. It should be understood that the geometry of channel 40 corresponds to the geometry first center plate 30 and second center plate 34. Also, the thickness (or, vertical height) of channel 40 is substantially similar to that of first center plate 30 and second center plate 34.

Figure 1B:
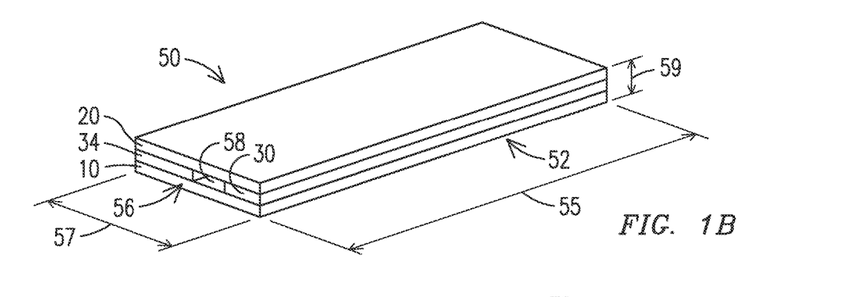

FIG. 1B shows an engaged (vertically stacked) configuration 50 having first center plate 30 and second center plate 34 engaged with first plate 10 and second plate 20. The outer lengthwise dimension (that is, the dimension facing away from channel 56) of first center plate 30 is aligned, or flush, with a first outer edge 52 of first plate 10. Likewise, an outer lengthwise dimension of second outer edge is aligned, or flush, with a second outer edge of first plate 20. This configuration allows the width of first center plate 30 plus the width of second center plate 34 plus the width of opening 58 to be substantially identical to width 57 of first plate 10 and second plate 20. Further, this allows engaged configuration 50 to have a channel 56 extending through engaged configuration 50. Channel 56 has an opening 58 at each widthwise dimension of engaged configuration 50. Also, as shown in FIG. 1B, the height 59 of the engaged configuration 50 is approximately 12 mm. However, in other embodiments, height 59 could be greater than or less than the embodiment shown.

Figure 1C:
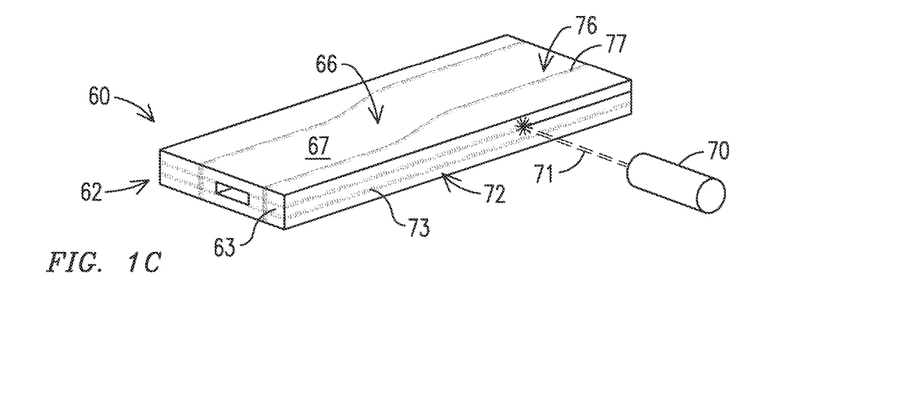
Figures 1D, 1E:
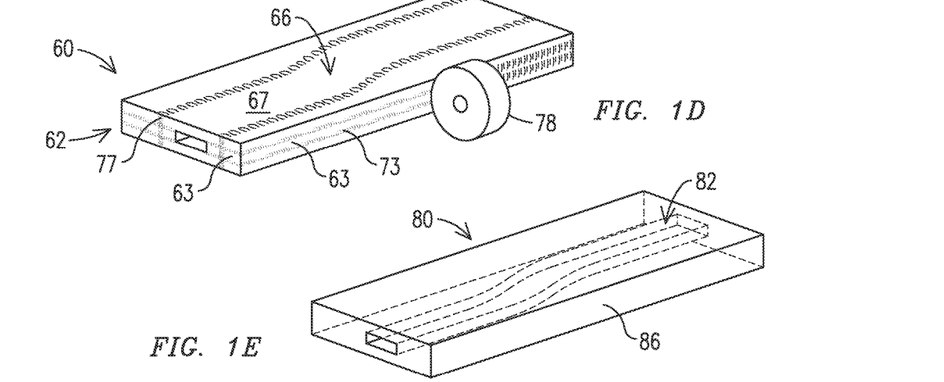

FIGS. 1C-1D illustrate the process of assembling first center plate 30 and second center plate 34 to first plate 10 and second plate 20, thereby creating a welded configuration 60. FIG. 1C shows the configuration as shown in FIG. 1B, with several welding steps used to assemble the plates. A welding tool 70 is used to create the various welds of the welded configuration 60. Welding tool 70 could be any tool having sufficient power to create a weld through the several stainless steel plates. In particular, the welding tool 70 can create a weld extending from an outer (top) surface 66 of a top plate, or second plate 20 (shown in FIG. 1B) to an opposite outer surface of a bottom plate, or first plate 10 (shown in FIG. 1B). In the embodiment shown in FIG. 1C, welding tool 70 is a laser weld tool producing a laser beam 71 of sufficient strength to perform the necessary welds shown. In order to achieve a proper weld, welding tool 70 was moved at various distances, and accordingly, laser beam 71 contacted welded configuration 60 at various distances until a desired result was achieved. Further, the focal point of laser 71 may be adjusted to achieve a desired result. In other embodiments, diffusion bonding could be used instead of welding tool 70. In particular, in some embodiments where titanium is used for plates, diffusion bonding is desirable to bond the various plates and create a desired visual effect.

As shown in 1C, first welds 76 are performed on outer surface 66 of the top plate. In other embodiments, first weld 76 could be performed on an outer surface of first plate 10. First welds 76 create a weld between the top plate and two plates (such as first center plate 30 and second center plate 34) disposed between the top plate and the bottom plate. In other words, first weld 76 is capable of welding the two middle plates to the top plate and the bottom plate in a single step. In order to achieve this result, it is empirically shown that power approximately in the range of 0.5 to 8.5 kilowatts ("kW") could be used. In other embodiments, first welds 76 weld the middle plates to the top plate, and a subsequent weld is necessary on the outer surface of the bottom plate to weld the middle plates to the bottom plate. First weld 76 also corresponds to the non-linear path of a channel between the top plate and the bottom plate (for example, channel 40 shown in FIG. 1A). First welds 76 generally correspond to the shape of the channel such that first welds 76 engage the middle plates and does not engage the channel. The area free of welding due to a channel below the top plate (or conversely, above the bottom plate) is defined as 67.

FIG. 1C further shows a second welds 72 made along the lengthwise edge surfaces of the welded configuration 60. Second welds 72 are configured to weld the middle plates to the top plates at outer edges of the plates. Although not shown for one of the middle plates, both middle plates receive a second weld 72 (for example, on a lengthwise side of first center plate 30 and second center plate 34 not shown). Third welds 62 may be made along the widthwise edge surfaces the welded configuration 60. Although not shown for one of the middle plates, both middle plates receive a third weld 62 (for example, on a widthwise side of second center plate 34 not shown). Second welds 72 and third welds 62 are configured to create seam or joint such that first center plate 30 and second center plate 34 are further bonded with first plate 10 and second plate 20. In some embodiments, second welds 72 may be continuous welds from one edge to an opposite edge. In other embodiments, spot welding could be used for second welds 72 and third welds 62. For example, an initial portion of second welds 72 may be welded followed by subsequent second welds 72 to a subsequent portion. Similar alternatives for third welds 62 are also possible. These alternatives could be made due to considerations such as power of welding tool 70 and/or to avoid welding into openings, channels, or cavities.

It should be understood that first weld 76, second weld 72, and third weld 62 are not intended to denote a particular order of creating welds. Rather, any order of welding among first weld 66, second weld 72 and third weld 62 could be used to achieve a desired result (such as alignment of the plates and/or efficiency of manufacturing).

Also shown in FIG. 1C are weld reinforcement mark, or simply weld mark, resulting from the various welds. First weld mark 77 corresponds to first weld 76, second weld mark 73 corresponds to second weld 72, and third weld mark 63 corresponds to third weld 62. These weld mark may protrude in a distal direction with respect to the welded configuration 60.

In order to achieve a desired cosmetic appeal, first weld mark 77, second weld mark 73, and third weld mark 63 may be removed. As shown in FIG. 1D, a mechanical tool 78, or simply tool, may be used to remove first weld mark 67, second weld mark 72, and third weld mark to create relatively smooth surfaces. Tool 78 could be any tool known in the art for removing weld mark or weld residue. In the embodiment shown in FIG. 1D, tool 78 is a grinding wheel. While grinding wheel 78 can remove first weld mark 77, second weld mark 73, and third weld mark 63, there still may be noticeable traces of welded regions left behind. For example, FIG. 1D shows outer surface 66 of the top plate showing traces of first weld 76. Similarly, traces of second weld 72 are also visible after tool 78 removed a portion of second weld 72.

To further achieve the desired cosmetic appeal or visual effect, FIG. 1E shows the welded configuration of FIG. 1D, further having a polishing step to remove any visible traces of first weld mark 67, second weld mark 73, and third weld mark 63. The final polished configuration 80 includes a channel 82 configured to receive a cable connected to an electronic device or a circuit. The finished polished surfaces, denoted as 86, shows the desired exterior finish. This can provide the finished structural member with the appearance of being formed from a single piece of metallic material.

Figure 2:
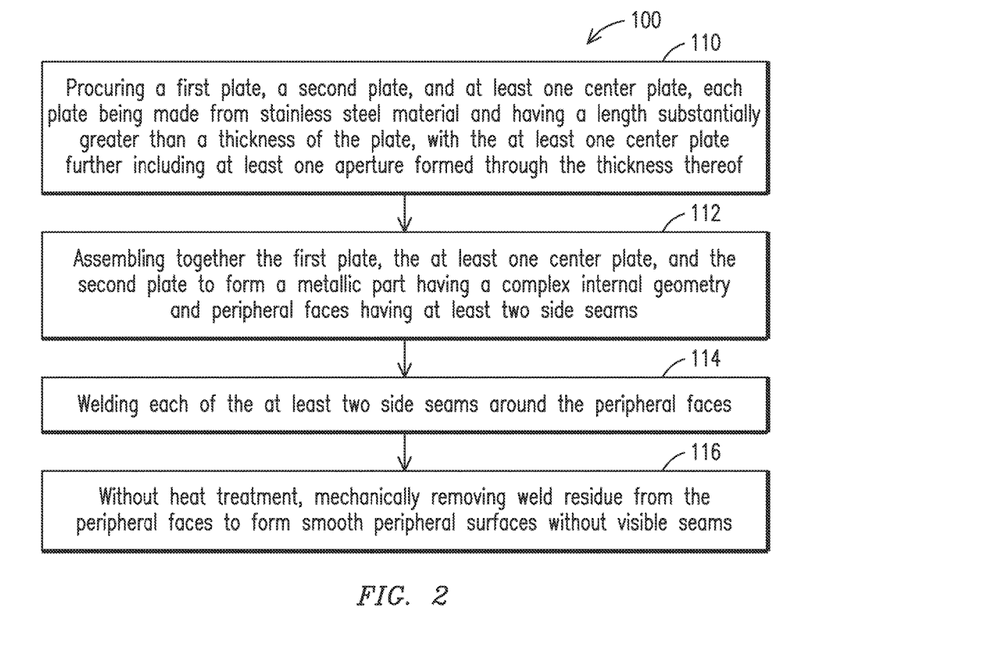
FIG. 2 is a flowchart depicting a method for making a metallic part, in accordance with another representative embodiment.

FIG. 2 is a flowchart depicting a method 100 for making a structural member having a complex internal geometry and substantially seamless outer surfaces, in accordance with the embodiment previously shown. The method includes a first step 110 of obtaining or procuring a first plate, a second plate, and one or more center plates, with each plate having a length that is substantially greater than the thickness of the plate. As previously stated, in some embodiments, the plates could be made of stainless steel. The method also includes another step 112 of assembling together the first plate, the center plates, and the second plate to form a structural member having an internal geometry and peripheral faces having at least two side seams. The internal geometry can be any number of complex internal geometries. The method further includes a step 114 of welding the center plates to the top plate and the bottom plate. The center plates have dimensions such that a channel is formed when the center plates are attached to the top plate and the bottom plate. Also, a further step 116 is used to mechanically remove weld residue from the peripheral faces to form smooth peripheral surfaces without visible seams. The smooth peripheral surfaces can include a polishing step. Also, the mechanical removal may be performed without the use of heat treatment. For example, a grinding process may remove traces of seams.

Figure 3A:
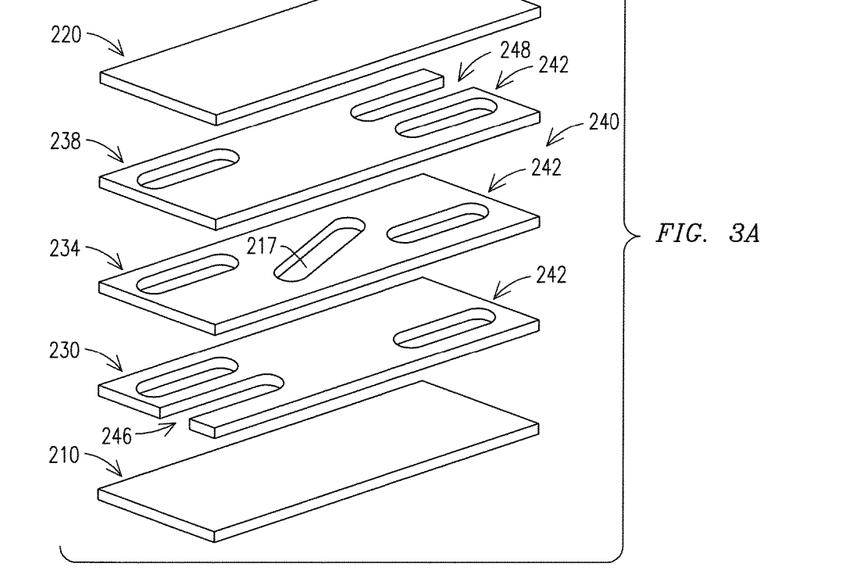
FIGS. 3A-3C are perspective schematic views of the making of a metallic part from a plurality of metallic plates, in accordance with yet another representative embodiment.
Figures 3B, 3C:
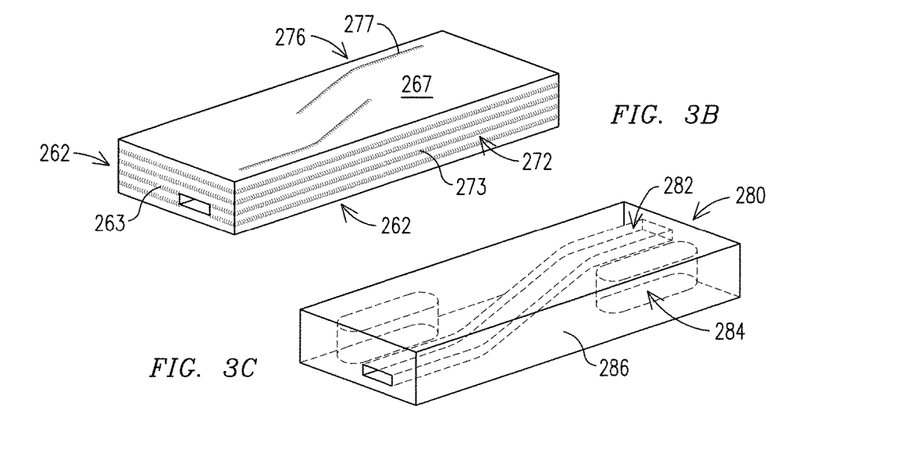

FIGS. 3A-3C show perspective views of forming another structural member 280 (welded and polished in FIG. 3C) from a plurality of plates. While previous embodiments disclose a structural member having two center plates between a first plate and a second plate, other embodiments may have three or more center plates. Still, other embodiments could include center plates (between a first plate and second plate) lying on top of one another. In the embodiment shown in FIGS. 3A-3C, first center plate 230, second center plate 234, and third center plate 238 are all disposed between first plate 210 and second plate 220. First plate 210, second plate 220, first center plate 230, second center plate 234, and third center plate 238 may be made from the same materials and have substantially similar dimensions (in terms of length, width, and thickness) as that of the plates described in the previous embodiments.

Also, the previous embodiments disclosed a channel 40 have a substantially co-planar path (with respect to first center plate 30 and second center plate 34), the channel in a structural member may not be co-planar with just one plate or plates. This may require various channels that are non-continuous from one end of a plate to another end of a plate. For example, FIG. 3A shows first center plate 230 having first channel 246 having an opening on a widthwise surface of first center plate 230 and extending only partially into first center plate 230. As shown, first channel 246 includes a curved surface connecting two straight, parallel surfaces. In other embodiments, first channel 246 could have dimensions suitable to achieve a desired path to receive, for example, a cable. Third center plate 238 includes third channel 248 having similar dimensions to that of first channel 246. However, first channel 246 and third channel 248 may be different in other embodiments. For example, first channel 246 could be greater than third channel 248, or vice versa. Also, while first channel 246 is disposed near an edge of first center plate 230, third channel 248 is disposed near an edge that is diagonal to edge near first channel 248. The edge near first channel 246 is opposite to the edge near third channel 248 in both a lengthwise and widthwise manner. In other words, if first channel 246 and third channel 248 were disposed on the same center plate, a diagonal line could be required to connect first channel 246 to third channel 248. In other embodiments, first channel 246 and third channel 248 are not diagonal with respect to one another.

Second center plate 234 includes second channel 217 that, as shown, is generally diagonal. When first center plate 230 is engaged and aligned with second center plate 234, and when second plate 234 is engaged and aligned with third center plate 238 (as shown in FIG. 3B), at least a portion of second channel 217 is disposed over first channel 246 and at least a portion of second channel 217 is disposed under third channel 248. Such a configuration may produce a path having both a substantially horizontal component and a substantially vertical component (see channel 282, in FIG. 3C). In this manner, a cable may extend through first channel 246 in a substantially horizontal manner, then extend through second channel 217 in a diagonal (but vertically upward) manner, and then extend through third channel 248 in a substantially horizontal manner. Of course, the cable could take the opposite path (for example, by first extending through third channel 248). It would be appreciated by one of skill in the art that it would be difficult, if not impossible, to machine a solid substrate using conventional tooling and manufacturing techniques, especially in the small sizes described, to create a cavity having a substantially non-linear path.

FIG. 3A also illustrates first center plate 230, second center plate 234, and third center plate 238 each having multiple openings 242 disposed within the plates. Openings 242 in third center plate 238 are disposed over openings 242 in second center plate 234, which in turn, are disposed in openings 242 over first center plate 230 such that when the plates engage one another (see FIG. 3B), the opening 242 create a cavity having a thickness substantially similar to the combined thickness of first center plate 230, second center plate 234, and third center plate 238 (see cavity 284, in FIG. 3C). As shown, the cavity is generally elliptical. However, in other embodiments, the cavity could be any cavity necessary to achieve a desired shape (for example, to house a particular component). Also, in other embodiments, there could be three or more openings 242 disposed in each of first center plate 230, second center plate 234, and third center plate 238. Still, in other embodiments, there may be only one opening 242 disposed in first center plate 230, second center plate 234, or third center plate 238. Alternatively, there could be openings 242 limited to, for example, first center plate 230 and second center plate 234.

FIG. 3B illustrates a similar welding operation previously described used to weld plates together along the face as well as the edges. Because additional center plates are used, additional power may be supplied to a welding tool in order to weld from outer surface 267 of second plate 220 vertically down to first plate 210. Alternatively, the welding tool may, for example, piecewise weld second plate 220 to third center plate 238 and second center plate 234, followed by welding first plate 210 to first center plate 230 and second center plate 234. It will be understood that the welding tool will avoid any openings (for example, opening 242 and first channel 246) while welding the plates together. Generally, there are no welds within any opening. FIG. 3B shows first welds 276 on outer surface 267 with a resultant first weld mark 277, second welds 272 on lengthwise edges with resultant second weld mark 273, and third welds 262 with resultant third weld mark 263. Although not shown, all center (or middle) plates receive a second weld 272 (for example, on a lengthwise side of second center plate 234 not shown). Also, although not shown, all middle plates receive a third weld 262 (for example, on a widthwise side of second center plate 234 not shown). First weld mark 277, second weld mark 273, and third weld mark 263 may be removed by any means described in the previous embodiments. As with the previous embodiments, the denotation of a first weld, a second weld, and a third weld are not intended to specify a particular order of welds made to the structural member.

FIG. 3C illustrates a subsequent polishing process performed to structural member 280 having a substantially seamless surface 286. The polishing process used to remove any remaining traces of welds may be performed by any means described in the previous embodiments.

Figure 4A:
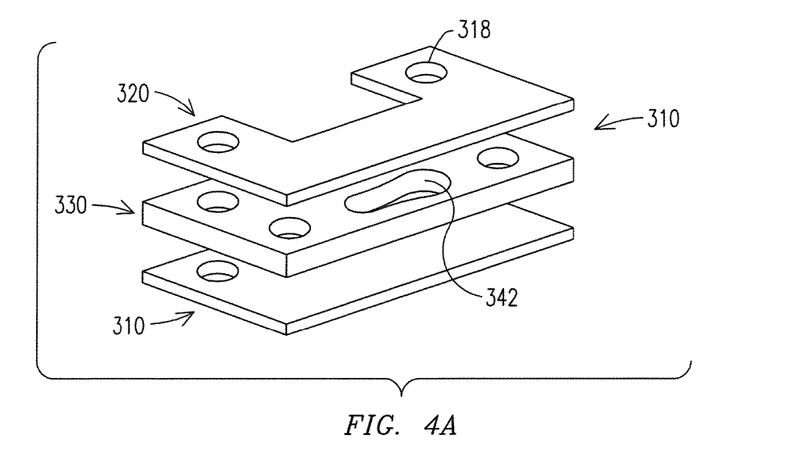
FIGS. 4A-4C are perspective schematic views of the making of a metallic part from a plurality of metallic plates, in accordance with yet another representative embodiment.
Figure 4B:
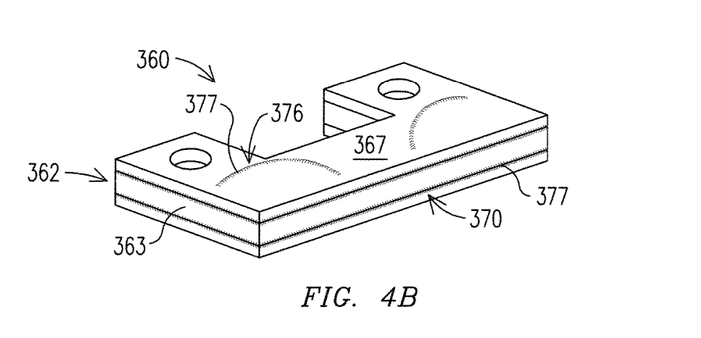
Figure 4C:
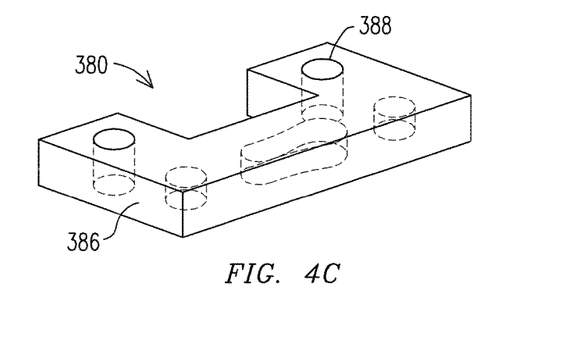

In some embodiments, channels may extend through the (combined) structural member in a substantially vertical direction rather than a substantially horizontal direction. For example, FIGS. 4A-4C illustrate an embodiment of a structural member 380 (welded and polished in FIG. 4C) with such a configuration. As shown in FIG. 4A, center plate 330 is positioned between first plate 310 and second plate 320. Each of first plate 310, second plate 320, and center plate 330 include at least one opening 318. Opening 318 could be a shape having curved surfaces or having three, four, or five or more sides. In the embodiment shown in FIG. 4A, opening 318 is generally circular. FIG. 4A also illustrates first plate 310 having an opening 318 intending to align with opening 318 of center plate 330, and also second plate 320 having an opening 318 intending to align with opening 318 of center plate 330, thereby creating a cavity 388 through the structural member (see FIG. 4C). In this manner, cavity 388 may receive a cable in a substantially vertical direction. Alternatively, an object (for example, a small screw) could be inserted into cavity 388 in order to secure structural member 380 to another structural (for example, a printed circuit board). First plate 310, second plate 320, and center plate 330 may be made from the same materials and have substantially similar dimensions (in terms of length, width, and thickness) as that of the plates described in the previous embodiments.

Also, FIG. 4A shows center plate 330 having opening 318 and opening 342, but no corresponding openings 318 and opening 342 within first plate 310 or second plate 320, respectively. This configuration may be used, for example, to store particular components with openings 318 and opening 34 of center plate 330. In embodiments where plates are electrically conductive, the components may be electrically connected to components external to the structural member 380. Also, components within openings 318 and/or opening 342 may be shielded (in some cases, mechanically and/or electrically) from other components. Also, first plate 310, second plate 320, and center plate 330 may be shaped in a form different from a substantially rectangular shape. For example, FIG. 4A shows first plate 310, second plate 320, and center plate 330 each being "C-shaped" and each having six lateral surfaces. In this manner, structural member 380 may be configured to fit in a particular shape that structural member could not otherwise fit into. It should be understood that first plate 310, second plate 320, and center plate 330 could be shaped in a manner such that structural member 380 achieves a desired shape for a particular purpose.

FIGS. 4B and 4C illustrate the welding and polishing procedures, respectively, described in the previous embodiments. In FIG. 4B, welded member 360 includes first welds 376 on outer surface 367 includes first weld mark 367, followed by a second welds 377 on a lengthwise edge 370, and a third welds 362 on widthwise edge 363. Although not shown, center plate 330 receives a second weld 377 on the lengthwise side of center plate 330 not shown. Also, although not shown, center plate 330 receives a third weld 362 on the widthwise side of center plate 330 not shown. Collectively, it should be understood that the C-shaped configuration of the embodiment shown in FIGS. 4A-4C receive second weld 377 and third weld 362 around the entire outer perimeter of welded member 360. As with the previous embodiments, the denotation of a first weld 376 a second weld 377, and a third weld 362 are not intended to specify a particular order of welds made to the structural member. Again, care is taken to avoid welding into openings 318 and/or openings 342. FIG. 4C shows the final, polished structural member 380 having a substantially seamless surface 386.

Some embodiments may include a pair of plates having a particular channel, opening and/or cavity on one surface. For example, in the embodiment shown in FIGS. 5A and 5B, first plate 410 includes a channel 442 extending lengthwise through first plate 410 from one edge of first plate 410 to another, opposite edge of first plate 410. First plate 410 further includes cavity 444. In other embodiments, first plate 410 may include two or more cavities 444. Second plate 420, on the other hand, is free of any openings, channels, and/or cavities. In other embodiments, second plate 420 may include openings, channels, and/or cavities corresponding (or complimentary) to first plate 410. Yet, in other embodiments, second plate 420 may include openings, channels, and/or cavities distinct from that of first plate 410. Also, first plate 410 and second plate 420 may be made from the same materials and have substantially similar dimensions (in terms of length, width, and thickness) as that of the plates described in the previous embodiments.

Figure 5A:
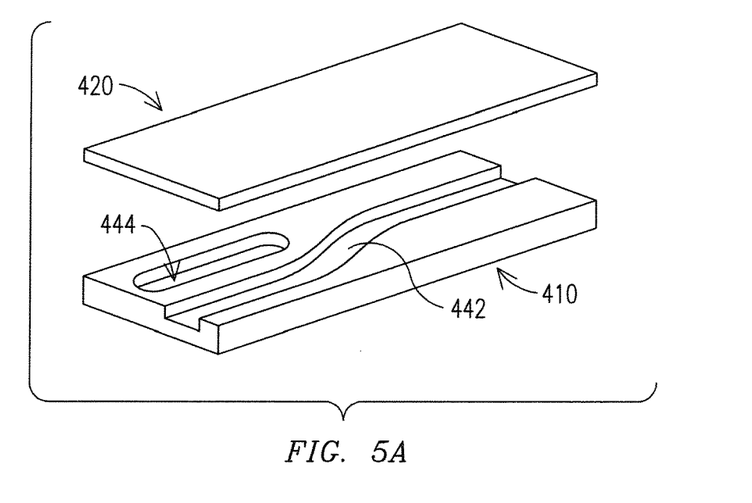
FIGS. 5A-5C are perspective schematic views of the making of a metallic part from a plurality of metallic plates, in accordance with yet another representative embodiments.
Figure 5B:
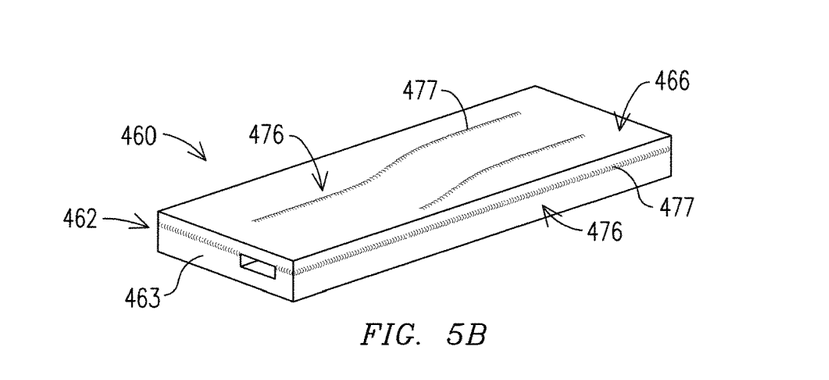
Figure 5C:
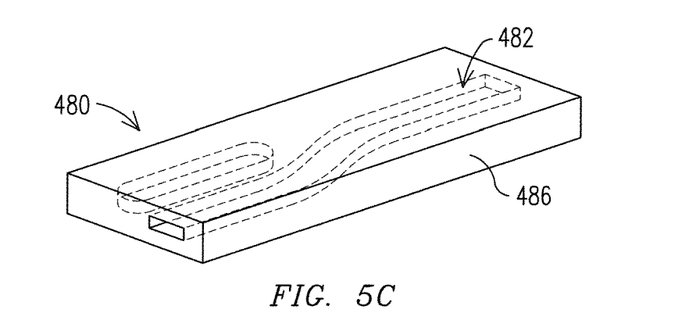

FIGS. 5B and 5C illustrate the welding and polishing procedures, respectively, described in the previous embodiments. In FIG. 5B, welded member 460 includes first welds 476 on outer surface 466 includes first weld mark 467, followed by a second welds 477 on a lengthwise edge 476, and a third welds 462 on widthwise edge 463. As with the previous embodiments, the denotation of a first weld 476, a second weld 477, and a third weld 462 are not intended to specify a particular order of welds made to the structural member. Again, care is taken to avoid welding into channel 442 and cavity 444. FIG. 5C shows the final, polished structural member 480 having a substantially seamless surface 486.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A method for assembling a structural member that includes a channel for a component, the method comprising:
    positioning inner layers between a first outer layer and a second outer layer, wherein the inner layers include a first inner layer having a first opening and a second inner layer having a second opening that is aligned with the first opening so that the first and second openings define the channel that is capable of receiving the component; and
    welding the inner layers to the first and second outer layers by directing a laser beam at a respective outer surface of at least one of the first or second outer layer such that respective interface surfaces of the first and second outer layers are welded to the inner layers along a path generally corresponding to a contour of the channel, wherein the first and second outer layers are generally parallel to the respective interface surfaces.

2. The method according to claim 1, further comprising:
    placing a third inner layer below the first and second inner layers, wherein the third inner layer includes a third opening that is aligned with the first or second opening.

3. The method according to claim 1, further comprising:
    removing any weld mark on the respective outer surface that is caused by welding the respective interface surfaces of the first and second outer layers to the inner layers.

4. The method according to claim 2, wherein the channel comprises:
    a first channel portion formed in the first inner layer; and
    a second channel portion formed in the second inner layer.

5. The method according to claim 4, wherein the second channel portion comprises a diagonal channel portion.

6. The method according to claim 1, wherein the laser beam forms a weld through at least one of the first or second outer layers.

7. The method according to claim 1, wherein the first outer layer and the second outer layer are free of openings.

8. A method of forming a structural member having a generally seamless surface finish and a cavity, the method comprising:

placing central layers between first and second outer layers such that the central layers contact a first interface surface of the first outer layer and a second interface surface of the second outer layer, wherein the central layers include a first central layer having a first opening and a second central layer having a second opening that is aligned with the first opening such that the first and second openings define the cavity; and     directing a laser beam along an outer surface of the first or second outer layer to weld the central layers to the first and second outer layers, wherein the outer surface is generally parallel to the first and second interface surfaces.

9. The method according to claim 8, wherein the central layers and the first and second outer layers are characterized as having a substantially identical outer lengthwise dimension.

10. The method according to claim 8, further comprising:

placing a third central layer below the first inner layer and the second inner layer, and wherein the third central layer comprises a third opening aligned with the first opening or the second opening to define the cavity.

11. The method of claim 8, wherein the first and second central layers have a generally equal amount of thickness.

12. The method of claim 8, further comprising:

mechanically removing any weld mark on the outer surface of the first or second outer layer that is caused by welding respective interface surfaces of the first or second outer layers to the central layers.

13. The method of claim 1, wherein the first and second inner layers are characterized as having a generally equal amount of thickness.

14. The method of claim 8, wherein the first and second outer layers are characterized as having a generally equal amount of thickness.

15. The method of claim 8, wherein the cavity has a diagonal shape.

\* \* \* \* \*